Figure 1:
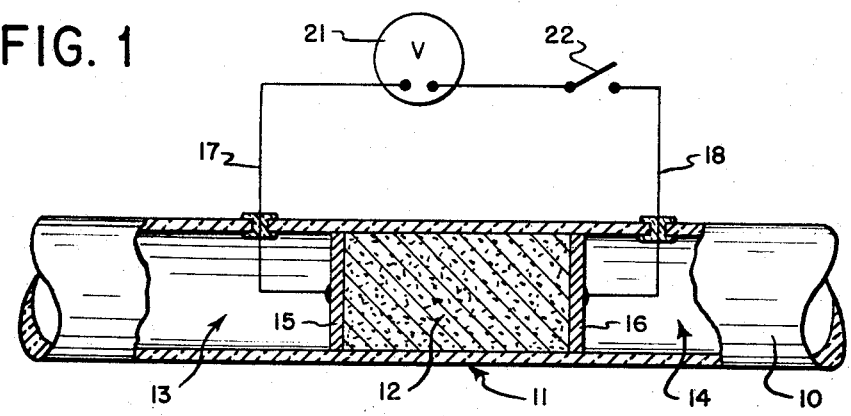

Nov. 12, 1968  R. B. HOLDEN  3,410,780
ELECTROCHEMICAL HYDROGEN METER
Filed Oct. 22, 1965

INVENTOR
Robert B. Holden
BY
Pennie, Edmonds, Morton, Taylor & Adams
ATTORNEYS

# 3,410,780
ELECTROCHEMICAL HYDROGEN METER
Robert B. Holden, Orange, Conn., assignor to United Nuclear Corporation, a corporation of Delaware
Filed Oct. 22, 1965, Ser. No. 501,139
14 Claims. (Cl. 204—195)

This invention relates to an electrochemical device for continuously measuring the concentration of hydrogen in a hydrogen-containing material, the device utilizing certain metal hydrides that conduct electricity by the movement of hydride ions therethrough to effect the aforesaid measurement of hydrogen concentration.

There exists in the electronic, nuclear and related arts a need for a simple and reliable means for substantially continuously measuring the concentration of elemental hydrogen that may be present in a vessel or substance. For example, the presence of hydrogen in many of the liquid and solid materials employed in the aforementioned arts has a detrimental effect on the desired properties of these materials, and if the quantity of hydrogen present in such a material is excessive it is necessary to take steps to reduce or substantially completely remove hydrogen from the material. In other situations hydrogen is a required or desirable constituent of the material, and if the quantity of hydrogen present in the material is too low it is necessary to introduce hydrogen into the material in order to build up the concentration of hydrogen therein to the required level. As a consequence it is frequently necessary to measure substantially continuously the concentration of hydrogen in such materials in order to maintain the hydrogen content thereof below, or above, the critical concentration. However, the physical and chemical procedures heretofore employed for this purpose have not been entirely satisfactory, and after an extensive investigation into this problem I have devised a new electrochemical device which utilizes the ionic conductivity of certain metal hydrides to measure the concentration of hydrogen in hydrogen-containing materials.

Substances which conduct electricity by the movement of ions, rather than by the movement of electrons, therethrough are said to be ionic conductors. Certain metal hydrides which are known as the "saline" or "salt-like" hydrides have been found to be ionic conductors of electricity; that is, they have been found to be capable of conducting an electric current by the movement of hydride ions (H-ions) therethrough. As a consequence of the ionic conductivity of these saline hydrides, it has been found that when an electric current is passed through a saline hydride gaseous hydrogen present at the cathode can be electrolytically reduced to form hydride ions and than an equivalent amount of hydrogen gas is liberated at the anode according to the half cell reactions:

(1) 

(2) 

In the course of the aforementioned investigation I further discovered that when a saline hydride is disposed between and in contact with two substances or bodies each containing a different concentration of elemental hydrogen a measurable electrical potential or E.M.F. is generated across the saline hydride, the magnitude of the E.M.F. thus generated being proportional to the difference in the concentration of hydrogen in the two substances. As a result of this discovery I have devised an electrochemical device adapted to measure substantially continuously the concentration of hydrogen in a hydrogen-containing substance or material. My new electrochemical device for measuring the concentration of hydrogen comprises an electrolyte chamber containing a saline hydride electrolyte which conducts electricity by the movement of hydride ions therethrough, a cathode in electrical contact with one surface of the saline hydride electrolyte, an anode in electrical contact with a second surface of the saline hydride electrolyte, and voltmeter means electrically connected to the cathode and the anode for measuring the voltage or E.M.F. across the saline hydride. The cathode and the anode are both formed of an electrically conductive material which is permeable with respect to elemental hydrogen and which is inert with respect to the saline hydride electrolyte with which it is in contact. A cathode compartment communicates with the cathode, the cathode compartment being adapted to contain a hydrogen-containing material the concentration of hydrogen in which is known, and an anode compartment communicates with the anode of the device, the anode compartment being adapted to contain a hydrogen-containing material the hydrogen contact of which is to be measured. The cathode compartment and the anode compartment are separated by, but are electrically connected by means of, the saline hydride electrolyte contained in the electrolyte chamber of the device.

As previously mentioned, the operation of my new hydrogen meter is predicated on my discovery that when a saline hydride is disposed between and in contact with two substances each containing a different concentration of hydrogen, a measurable E.M.F. will be generated across the saline hydride that is related to the difference in hydrogen concentration. Thus, if the concentration of hydrogen is one of the hydrogen-containing substances or materials is known, the concentration of hydrogen in the other substance or material can be determined in accordance with the equation:

(3) $\text{E.M.F.} = (RT/F) \log_e (C_1/C_2)$ where $R$ is the gas constant,
$T$ is the temperature (° K.),
$F$ is Faraday's constant,
$C_1$ is the known concentration of hydrogen in the hydrogen-containing material in the cathode compartment, and
$C_2$ is the unknown concentration of hydrogen in the hydrogen-containing material in the anode compartment.

By measurement of the E.M.F. generated across the saline hydride as a result of the said different concentrations of hydrogen, and by substitution of the known quantities or values in the above equation, the concentration of hydrogen in the material being monitored may readily be determined.

Figure 2:
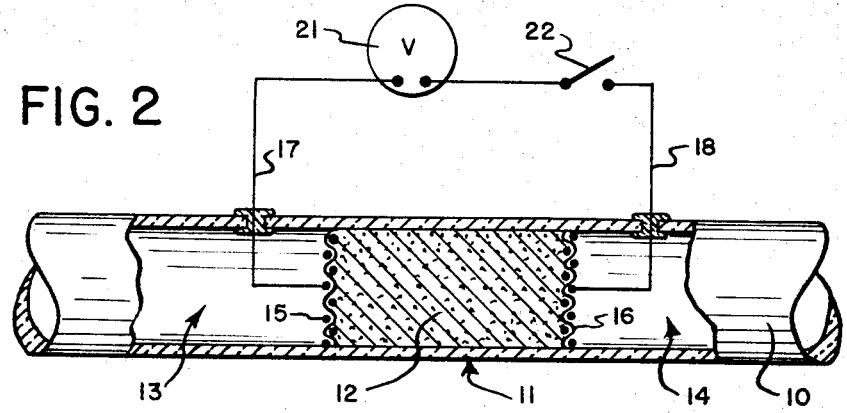
Figure 3:
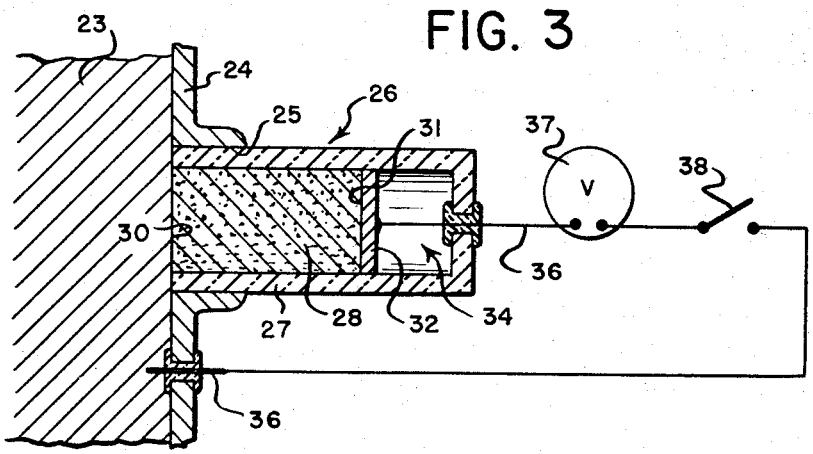

My new device for measuring the hydrogen content of a hydrogen-containing material will be better understood from the following detailed description thereof in conjunction with the accompanying drawing of which FIG. 1 is a cross-sectional view of an advantageous embodiment of the device, FIG. 2 is a cross-sectional view of a modification of the device shown in FIG. 1, and FIG. 3 is a cross-sectional view of a modification of the device that is specifically adapted to measure the hydrogen content of liquid metal such as liquid sodium.

In the advantageous embodiment of my new apparatus shown in FIGS. 1 and 2, a cylindrical vessel 10 fabricated from an electrically insulating material, for example, a length of glass tubing, is divided longitudinally into an electrolyte chamber 11 filled with a saline hydride electrolyte 12, for example, lithium hydride, a cathode compartment 13 adapted to contain elemental hydrogen or a hydrogen-containing material the concentration of hydrogen in which is known, and an anode compartment 14 adapted to contain a hydrogen-containing gaseous, solid or liquid material the concentration of hydrogen in which is to be measured or determined. A cathode 15 formed from an electrically conductive material that is permeable with respect to elemental hydrogen is in electrical contact with one surface of the saline hydride electrolyte 12, and an anode 16 also formed from electrically conductive material that is permeable with respect to elemental hydrogen is in electrical contact with another surface of the electrolyte. The cathode 15 and the anode 16 are electrically connected by means of electric leads 17 and 18 to a voltmeter 21 or equivalent means for measuring the potential difference between the cathode and the anode of the meter.

The saline hydrides employed as the electrolyte 12 in my device are ionic compounds formed from a metal cation and a hydride anion, the hydride ion resembling a halogen in the compound. As previously mentioned, when a saline hydride is disposed between and in contact with two hydrogen-containing materials (for example, the cathode 15 and the anode 16 of my hydrogen meter) each containing a different concentration of hydrogen, an electrical potential or E.M.F. is generated across the saline hydride. It is this unique property of the saline hydrides that is made use of in the electrochemical hydrogen meter of my invention. Specifically, the saline hydrides useful in the practice of my invention are those which conduct electricity predominantly by the movement of hydride ions therethrough. These hydrides comprise the alkali metal hydrides (lithium, sodium, potassium, rubidium and cesium hydrides), the more electropositive of the alkaline earth metal hydrides (calcium, strontium and barium hydrides), and mixtures of these hydrides. Of these I presently prefer to use lithium hydride, or calcium hydride containing a minor quantity of lithium hydride, as the saline hydride electrolyte component of my device. With specific reference to the latter mixture of saline hydrides, I have found that the addition of a small amount of a univalent cationic material, such as lithium in the form of lithium hydride, to a divalent saline hydride, such as calcium hydride, will generate a concentration of hydride ion ($H^-$) vacancies in the $CaH_2$ crystal lattice approximately equal to the lithium concentration in the mixture, and further that the electrical conductivity of the crystalline hydride increase as the anionic vacancy thereof increases.

The cathode 15 and the anode 16 that are in electrical contact with the saline hydride electrolyte 12 must not only be electrically conductive, but these electrodes must also be permeable with respect to elemental hydrogen and inert with respect to both the saline hydride employed as the electrolyte and the hydrogen-containing material or atmosphere contained in the cathode and anode compartments. If the hydrogen-containing material in either the cathode compartment 13 or the anode compartment 14 is itself electrically conductive and is inert with respect to the saline hydride electrolyte, it may serve as the cathode or the anode (as the case may be) of the device. Similarly, if the hydrogen-containing material in either the cathode or the anode compartment is inert with respect to the saline hydride electrolyte but is not a conductor of electricity, the cathode 15 or the anode 16 (as the case may be) may be formed of metal screen or mesh as shown in FIG. 2, or may be formed from sheet metal that is provided with a plurality of small openings or perforations, which (as clearly shown in FIG. 2) permits the hydrogen-containing material to come into physical and electrical contact with both the metal electrode and the contacting surface of the saline hydride electrolyte 12. If, on the other hand, the hydrogen-containing material in either the cathode or the anode compartment is not inert with respect to the saline hydride electrolyte, that is, if it either chemically attacks or physically dissolves the saline hydride, the cathode 15 (or the anode 16, as the case may be) must be formed from a solid sheet of an electrically conductive material, such as palladium or zirconium, which is permeable with respect to elemental hydrogen as well as being inert to both the saline hydride electrolyte and the aforementioned hydrogen-containing material.

When the cathode 15 comprises a layer of palladium (or other inert metal permeable to hydrogen) that separates the hydrogen-containing material (of known hydrogen concentration) in the cathode compartment 13 from the saline hydride in the electrolyte chamber 11, elemental hydrogen contained in the hydrogen-containing material in the cathode compartment diffuses into the layer of palladium and migrates to the interface of the cathode 15 and the saline hydride electrolyte 12, the concentration of hydrogen at the interface of the cathode equivalent to the concentration of hydrogen in the hydrogen-containing material in the cathode compartment 13 when stable or equilibrium operating conditions are attained. In like manner, when the anode 16 comprises a layer of palladium (or other inert metal permeable to hydrogen) that separates the hydrogen-containing material (of unknown hydrogen concentration) in the anode compartment 14 from the saline hydride in the electrolyte chamber 11, elemental hydrogen contained in the hydrogen-containing material in the anode compartment diffuses into the layer of palladium and migrates to the interface of the anode 16 and the saline hydride electrolyte 12, the concentration of hydrogen at the interface of the anode and the saline hydride electrolyte being substantially equivalent to the concentration of hydrogen in the hydrogen-containing material in the anode compartment 14 when stable operating conditions are attained. As a result, when stable operating conditions are attained the E.M.F. generated across the saline hydride electrolyte 12 is an accurate measure of the concentration of hydrogen in the hydrogen-containing material in the anode compartment 14 in spite of the fact that neither the hydrogen-containing material in the cathode compartment nor the hydrogen-containing material in the anode compartment are in direct physical contact with the saline hydride electrolyte 12. The hydrogen meter shown in FIGS. 1 and 2 is employed to continuously monitor and measure the concentration of hydrogen in a hydrogen-containing material by first introducing the "unknown" material (the hydrogen concentration in which is to be measured) into the anode compartment 14 and introducing a "control" material containing a known concentration of hydrogen into the cathode compartment 13 of the device. Then, after operating conditions have become stabilized (and, referring specifically to the embodiment of the device shown in FIG. 1, after elemental hydrogen from the hydrogen-containing materials in the cathode and anode compartments has diffused uniformly throughout the hydrogen-permeable cathode 15 and anode 16, respectively, so that the concentration of hydrogen at the interface of these electrodes and the saline hydride electrolyte 12 is equivalent to the concentration of hydrogen in the materials in the cathode and the anode compartments) the switch 22 is closed, and the E.M.F. generated across the electrolyte 12 is measured by means of the voltmeter 21. The concentration of hydrogen in the "unknown" material in anode compartment 14 is then determined by means of the relationship expressed in Equation (3) previously referred to. Any changes in the concentration of hydrogen in the "unknown" material in the anode compartment will be immediately indicated by a proportionate change in the E.M.F. generated across the electrolyte 12 and indicated by the voltmeter 21. Moreover, as the change in concentration of hydrogen in the anode compartment is accurately reflected by a corresponding change in the reading of the voltmeter, the scale on the face of the voltmeter can be calibrated to indicate directly the concentration of hydrogen in the material in the anode compartment. The embodiment of my device shown in FIG. 3 of the drawing is specifically adapted to measure the hydrogen concentration in the liquid metals (such as liquid sodium employed as a heat exchange medium in nuclear reactors) the hydrogen content of which (for example) must be maintained at as low a concentration as possible. The hydrogen-containing liquid metal 23 circulates through a suitable container or conduit one wall 24 of which is formed with an opening 25 adapted to receive the electrochemical hydrogen meter 26 of my invention. The meter 26 comprises a cylindrical body 27 formed of an electrically insulating material one end of which body 27 is received in the opening 25 formed in the wall 24. A solid saline hydride electrolyte 28 that is chemically and physically inert with respect to the liquid metal 23 is disposed in the electrolyte chamber of the cylindrical body 27. The inner surface 30 of the solid saline hydride electrolyte 28 is in direct contact with the liquid metal 23 which serves as the anode of the device, and the outer surface 31 of the electrolyte 28 is in contact with a palladium cathode 32 which, in turn, is in contact with gaseous hydrogen of known concentration contained in the cathode compartment 34 the device. An electric lead 35 extends through an insulating bushing in the wall 24, the inner end of the lead 35 being in electrical contact with the liquid metal 23, and an electric lead 36 extends through a similar bushing in the end wall of the cathode compartment 34 to contact the cathode 32. The anode (that is, the hydrogen-containing liquid metal 23) and the cathode 32 are electrically connected to a voltmeter 37.

The difference in the concentration of hydrogen in the liquid metal 23 and the concentration of hydrogen in the cathode compartment 34 causes an E.M.F. to be generated across the saline hydride electrolyte 28. After stable operating conditions have been established in the manner previously described, the switch 38 is closed so that the aforesaid E.M.F. or potential difference will be indicated by the voltmeter 37. Thereafter, changes in the concentration of hydrogen in the liquid metal 23 will be reflected by corresponding changes in the E.M.F. indicated by the voltmeter, as also previously described.

From the foregoing description of my electrochemical device for measuring the concentration of hydrogen in a hydrogen-containing substance or material, it will be seen that I have made an important contribution to the art to which my invention relates.

I claim:

1. An electrochemical hydrogen meter for substantially continuously measuring the concentration of hydrogen in hydrogen-containing material which comprises an electrolyte chamber containing a saline hydride electrolyte which conducts electricity by the movement of hydride ions therethrough, a cathode in electrical contact with one surface of said saline hydride electrolyte, said cathode comprising an electrically conductive material which is permeable with respect to hydrogen and which is inert with respect to the saline hydride electrolyte with which it is in contact, an anode in electrical contact with a second surface of the saline hydride electrolyte, said anode being formed from an electrically conductive material which is permeable with respect to hydrogen and which is inert with respect to the saline hydride electrolyte with which it is in contact, and means for measuring an electrical potential difference electrically connected to said cathode and to said anode.

2. The electrochemical device according to claim 1 in which the saline hydride electrolyte consists essentially of at least one metal hydride selected from the group consisting of lithium hydride, sodium hydride, potassium hydride, rubidium hydride, cesium hydride, calcium hydride, barium hydride and strontium hydride.

3. The electrochemical device according to claim 1 in which the saline hydride electrolyte consists essentially of lithium hydride.

4. The electrochemical device according to claim 1 in which the saline hydride electrolyte consists essentially of solid calcium hydride containing a minor amount of lithium hydride.

5. The electrochemical device according to claim 1 in which the anode comprises an electrically conductive fluid in which hydrogen is soluble and which is inert chemically and physically with respect to the saline hydride electrolyte with which it is in contact.

6. The electrochemical device according to claim 1 in which the anode comprises a fluid-pervious layer of electrically conductive material which is inert chemically and physically with respect to the saline hydride electrolyte with which it is in contact.

7. The electrochemical device according to claim 1 in which the anode comprises a hydrogen-permeable layer of electrically conductive material which is inert chemically and physically with respect to the saline hydride electrolyte with which it is in contact.

8. An electrochemical device for substantially continuously measuring the concentration of hydrogen in a hydrogen-containing material which comprises an electrolyte chamber containing a saline hydride electrolyte which conducts electricity by the movement of hydride ions therethrough, a cathode in electrical contact with one surface of said saline hydride electrolyte, said cathode comprising an electrically conductive material which is permeable with respect to hydrogen and which is inert with respect to the saline hydride electrolyte with which it is in contact, an anode in electrical contact with a second surface of the saline hydride electrolyte, said anode being formed from an electrically conductive material which is permeable with respect to hydrogen and which is inert with respect to the saline hydride electrolyte with which it is in contact, means for measuring an electrical potential difference electrically connected to said cathode and to said anode, a cathode compartment communicating with said cathode, said cathode compartment being adapted to contain a hydrogen-containing material the concentration of hydrogen in which material is known, and an anode compartment communicating with the anode of the device, said anode compartment being adapted to contain a hydrogen-containing material the concentration of hydrogen in which is to be measured when the device is in operation, the cathode compartment and the anode compartment being separated by the saline hydride electrolyte in the electrolyte chamber of the device.

9. The electrochemical device according to claim 8 in which the saline hydride electrolyte consist essentially of at least one metal hydride selected from the group consisting of lithium hydride, sodium hydride, potassium hydride, rubidium hydride, cesium hydride, calcium hydride, barium hydride and strontium hydride.

10. The electrochemical device according to claim 8 in which the saline hydride electrolyte consists essentially of lithium hydride.

11. The electrochemical device according to claim 8 in which the saline hydride electrolyte consists essentially of solid calcium hydride containing a minor amount of lithium hydride.

12. The electrochemical device according to claim 8 in which the anode comprises an electrically conductive fluid in which hydrogen is soluble and which is insert chemically and physically with respect to the solid saline hydride electrolyte with which it is in contact.

13. The electrochemical device according to claim 8 in which the anode comprises a fluid-pervious layer of electrically conductive material which is inert chemically and physically with respect to the saline hydride electrolyte with which it is in contact.

14. The electrochemical device according to claim 8 in which the anode comprises a hydrogen-permeable layer of electrically conductive material which is inert chemically and physically with respect to the saline hydride electrolyte with which it is in contact.

References Cited

UNITED STATES PATENTS

| | | | |
|---|---|---|---|
| 2,882,212 | 4/1959 | Beard | 204—195 |
| 2,886,497 | 5/1959 | Butler | 204—1.1 |
| 3,180,762 | 4/1965 | Oswin | 136—86 |
| 3,185,590 | 5/1965 | Mayer et al. | 136—153 |
| 3,297,551 | 1/1967 | Alcock | 204—1.1 |
| 3,325,378 | 6/1967 | Greene et al. | 204—1.1 |
| 3,336,162 | 8/1967 | Zachman | 136—86 |

HOWARD S. WILLIAMS, *Primary Examiner.*

TA HSUNG TUNG, *Assistant Examiner.*